United States Patent [19]

Shimizu et al.

[11] Patent Number: 5,936,224

[45] Date of Patent: Aug. 10, 1999

[54] METHOD AND APPARATUS FOR READING MACHINE-READABLE SYMBOLS BY EMPLOYING A COMBINATION OF MULTIPLE OPERATORS AND/OR PROCESSORS

[75] Inventors: Mark Y. Shimizu, Seattle; Lingnan Liu, Mill Creek, both of Wash.

[73] Assignee: Intermec IP Corporation, Beverly Hills, Calif.

[21] Appl. No.: 08/769,636

[22] Filed: Dec. 11, 1996

[51] Int. Cl.⁶ .................................................. G06K 7/10
[52] U.S. Cl. ................. 235/462.1; 235/454; 235/462.12; 235/462.25; 382/304
[58] Field of Search ..................................... 235/454, 462, 235/464, 463, 460, 462.01, 462.07, 462.1, 462.12, 462.16, 462.19, 462.25, 470; 382/304

[56] References Cited

U.S. PATENT DOCUMENTS

| | | | |
|---|---|---|---|
| 5,124,537 | 6/1992 | Chandler et al. | 235/462 |
| 5,155,343 | 10/1992 | Chandler et al. | 235/467 |
| 5,243,655 | 9/1993 | Wang | 380/51 |
| 5,389,770 | 2/1995 | Ackley | 235/462 |
| 5,486,689 | 1/1996 | Ackley | 235/463 |
| 5,514,858 | 5/1996 | Ackley | 235/462 |
| 5,539,191 | 7/1996 | Ackley | 235/462 |
| 5,553,084 | 9/1996 | Ackley et al. | 371/37.1 |
| 5,569,901 | 10/1996 | Bridgelall et al. | 235/470 |

*Primary Examiner*—Michael G. Lee
*Attorney, Agent, or Firm*—Seed and Berry LLP

[57] ABSTRACT

A method and apparatus for reading data collection symbols initially samples and preferably stores an image of light reflected from the symbol. An initial portion of the symbol in the stored image is located and multiple reading techniques are performed based on the stored symbol image and the located portion. Several output signals are produced from the multiple reading techniques, and one of the output signals is selected as a decoded signal that represents the data encoded in the symbol. The multiple reading techniques can be multiple reading methods performed substantially simultaneously with each other (on one or more processors), a single method performed multiple times and at multiple locations within the stored symbol image, or each reading method can be broken down into constituent modules, and like modules grouped into sets.

29 Claims, 4 Drawing Sheets

METHOD AND APPARATUS FOR READING MACHINE-READABLE SYMBOLS BY EMPLOYING A COMBINATION OF MULTIPLE OPERATORS AND/OR PROCESSORS

TECHNICAL FIELD

The present invention relates to a method and apparatus reading machine-readable symbols.

BACKGROUND OF THE INVENTION

Bar code symbologies are widely used for data collection. The first bar code symbologies developed, such as U.P.C., EAN, Code 39 and Code 93 can be referred to as "linear" symbologies because data in a given symbol is decoded along one direction or axis. Linear symbologies generally encode data characters as parallel arrangements of multiple width rectangular bars and spaces. Each unique pattern of bars and spaces within a predetermined width defines a particular data character. A given linear symbol encodes several data characters along its length as several groups of unique bar and space patterns.

Such linear symbologies are typically decoded using laser scanners or wand-based readers. In general, bar code readers scan a symbol and sample the scan line or lines to get a one-dimensional signal waveform and/or a sequence of distances between the bars and spaces in the symbol, and then analyze the waveform or distances to deduce the data encoded in the symbol. Various methods of decoding linear symbologies exist, such as edge-to-edge (element pairs) decoding of individual elements in a symbol, bar-to-bar or space-to-space comparisons, Factor R, and other known decoding methods. Each of such decoding methods provides an optimal method of decoding symbols from a particular symbology, of a particular form, or within a particular environment. Similarly, various methods exist in data scanning and waveform sampling to optimally attack different problems such as damaged symbols, blurring in symbol images, and so on. Additionally, various known methods exist for filtering or processing a waveform before decoding it to thereby improved decoding rates.

As data collection markets grew, greater amounts of data were required to be encoded within a smaller area (i.e., greater "information density"). To increase the information density in bar code symbologies, "multi-row" or "stacked" symbologies were developed such as Code 49 and PDF417. Stacked symbologies generally employ several adjacent rows, each row having several characters defined by groups of multiple width bars and spaces.

Difficulties arose in attempting to read and decode these stacked symbologies. For example, a typical laser scanner must be precisely aligned with each row in a stacked symbol for it to scan and properly decode the groups of bars and spaces in each row. If the laser scanner is skewed so that its beam scans across several rows, the resulting scan data cannot be accurately decoded. One known method, described in U.S. Pat. No. 5,243,655 (the '655 patent) allows a laser scanner to decode stacked bar code symbols, particularly PDF417 symbols. The scanner under the '655 patent, however, requires significant processing time. Additionally, the method of decoding a stacked bar code under the '655 patent is limited to use with a laser scanner.

As the result of such limitations of laser scanners, and to accommodate the increasing information-density in developing symbologies, such as the stacked symbologies, area or two-dimensional readers were created. U.S. Pat. No. 5,124, 537 (the '537 patent) describes a reader using virtual scan of a digital image memory to create the equivalent scanning pattern of a mechanical laser scanner. A two-dimensional image of a bar code symbol at any random orientation is captured in the image memory. A microprocessor in the reader scans the image memory to create a virtual scan equivalent to the scan pattern of a laser scanner. Alternatively, the image memory is divided into a plurality of memory segments, and virtual scan is provided simultaneously in each of the respective memory segments.

U.S. Pat. No. 5,155,343 (the '343 patent) describes an area reader that apparently improves over the method described in the '537 patent. The reader described in the '343 patent includes an image capture means for storing a two-dimensional image of the reader's field of view. The captured image may contain a bar code symbol. Once the image is captured in memory, a software method locate; the bar code symbol within the stored image and provides a coarse orientation of the symbol. After the image of the bar code symbol is located, and its coarse orientation determined, the software method determines a fine orientation of the symbol. Thereafter, the method filters, scans and decodes the bar code symbol.

Numerous other known methods of locating and decoding stacked and area symbologies exist. Each method typically provides an optimal method of decoding a particular symbology, or symbologies in a particular environment. Additional methods and routines exist for locating and decoding machine-readable symbols having damage, suffering from printing errors, having optical distortions, etc. Again, each of such methods is particularly suited for a particular type of damage or distortion for which a symbol suffers. In general, each method of sampling, detecting and decoding a particular symbol of a symbology provides a distribution or statistical sampling of data associated with the method's success in correctly sampling, detecting End decoding the information encoded in the symbol. Conversely, each method includes error rates of false detection and incorrect detection associated with the method. Overall, each method will have properties which address a particular symbology or problem more effectively than another method. Likewise, the particular method will have weaknesses or shortcomings for a particular problem that is effectively addressed by another method. For example, a particular method of sampling bars of a linear symbology can effectively sample, detect and decode such a symbol placed on random or noisy backgrounds. However, this method can be ineffective against the same symbol printed with wavy or noisy bars but on a noiseless background. Typically due to limitations in processing power and the time required to implement both of such methods, only one of such methods are typically included in a given reader.

SUMMARY OF THE INVENTION

A bar code reader could have a single algorithm designed to handle a variety of image defects, bar code damages, and distortions. However, such algorithms can be inefficient and difficult to build. An alternative is to build a system including multiple decoding methods, defect and distortion compensating methods, as well as other methods. Each method optimally handles a particular kind of defect, damage or distortion. If not managed carefully and using only one CPU, such a reader would consume substantial processing time, during which each method is performed to decode a given symbol. Such significant amounts of processing time are generally undesirable. Instead, most users of bar code readers desire to have symbols quickly decoded. Therefore, while methods may exist for decoding a given symbol which suffers from a particular type of damage, users typically will opt for a reader that can more readily decode most symbols, but which is incapable of decoding symbols suffering from certain types of damage. Thus, it is desirable to increase the efficiency as well as to improve the robustness of a symbology reading system.

Under the present invention, a method and apparatus provides an improved method of reading data collection symbols. In an exemplary embodiment of the present invention, the method, and corresponding apparatus, initially sample and preferably store an image of light reflected from the symbol. An initial portion of the symbol in the stored image is located and multiple reading techniques are performed based on the stored symbol image and the located portion. At least one output signal is produced from the multiple reading techniques, and one or the output signals is selected as a decoded signal that represents the data encoded in the symbol. The multiple reading techniques can be multiple reading methods performed substantially simultaneously with each other (on one or more processors), a single method performed multiple times and at multiple locations within the stored symbol image, or each reading method can be broken down into constituent modules and like modules grouped into sets.

The present invention embodies a method of reading an image of machine-readable visual indicia, such as bar code symbols, where the machine-readable visual indicia has several information bearing indicia extending and decodable along at least one axis. The method includes the steps of: (a) substantially simultaneously performing a plurality of reading techniques based on the image; (b) producing at least one output signal from at least one of the reading techniques; and (c) selecting one of the output signals as a decoded signal that represents the data encoded in the machinereadable visual indicia.

DETAILED DESCRIPTION OF THE INVENTION

A machine vision system, and in particular, an apparatus and method for locating, sampling, processing and decoding data collection symbols or other machine-readable images, is described in detail herein. In the following description, numerous specific details are set forth such as specific linear or stacked symbols, specific methods of locating, sampling, processing and decoding symbols, etc., in order to provide a thorough understanding of the present invention. On, skilled in the relevant art, however, will readily recognize that the present invention can be practiced without the specific details, or with other symbols, methods, etc. In other instances, well-known structures are not shown in detail in order to avoid obscuring the present invention.

Figure 1:
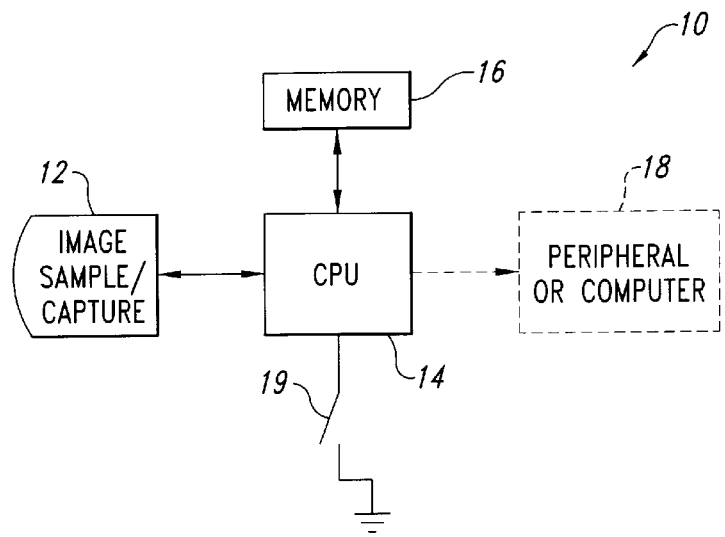
FIG. 1 is a block diagram of a data collection symbology reader of the present invention.

As shown in FIG. 1, a data collection symbology reader 10 of the present invention includes an image sampling or capturing device 12. As used herein, a "data collection symbol" refers to a symbol from any of the linear, stacked, area and other machine-readable symbologies. An "area" symbology, such as MaxiCode, Data Matrix or Code One, employs a matrix of data cells rather than one or more rows of bars and spaces. The height and width of each data cell within the matrix are generally equal, and the height and width of the symbol are generally comparable.

In an exemplary embodiment, the image capture device 12 is an area imager that contains an array of photosensitive elements, preferably a charge-coupled device ("CCD") having, for example, a rectangular active surface of 582×752 pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The 582×752 pixel element array defines the field of view of the area imager. Appropriate conventional focusing optics, electronics and/or a light source (not shown) are also provided as part of the area imager.

As is known, each pixel element in the CCD array of the area imager outputs a gray level signal, i.e., an analog signal that determines the amount or intensity of light impinging upon the particular pixel element. Alternatively, each pixel element in the CCD array of the area imager can output a signal that indicates the gray intensity value of the particular pixel element. The signals output from the CCD array are similar to video data. While the exemplary embodiment of the image sample/capture device 12 is an area imager, those skilled in the relevant art will readily recognize that other image sampling or capture devices can be employed such as laser scanners, pen-based readers, etc.

A central processing unit ("CPU") 14 receives the video data signals output from the area imager. The CPU 14 preferably includes an analog-to-digital converter that converts the gray level analog signals from the area imager into digital signals. The CPU 14 also preferably includes a clock operating at a high speed so that the CPU similarly operates at a rapid rate.

A memory 16, coupled to the CPU 14, stores the digital signals output from the CPU. The memory 16 preferably includes both volatile and non-volatile memory (e.g., random access and electronically erasable lead only memory). An object or image within the field of view of the area imager is converted into electrical signals that are digitized and stored in the memory 16 to be retrieved and processed by the CPU 14 under the routine described below. After processing the stored image, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the area imager to provide image signals to the CPU that constitute the instantaneous image within the field of view of the area imager. The specific means and method for storing an image of a symbol by the symbology reader 10 are conventional and will be understood by those skilled in the relevant art without need for further description herein.

Figure 2:
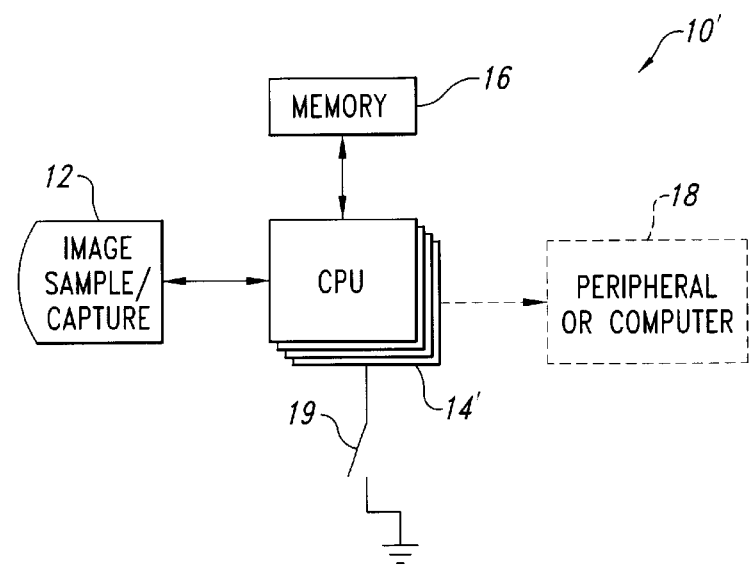
FIG. 2 is a block diagram of an alternate embodiment of the data collection symbology reader of FIG. 1.

Referring to FIG. 2, in an alternative embodiment, the symbology reader 10 includes multiple processors or CPUs 14'. Each of the CPUs 14' can be dedicated to a particular reading method, or various modules or tasks can be divided among the CPUs based on their availability, as described below. As used generally herein, a "reading method" or "method for reading" a machine-readable symbol includes one or more of the steps of locating, sampling, processing and/or decoding the symbol.

Figure 3:
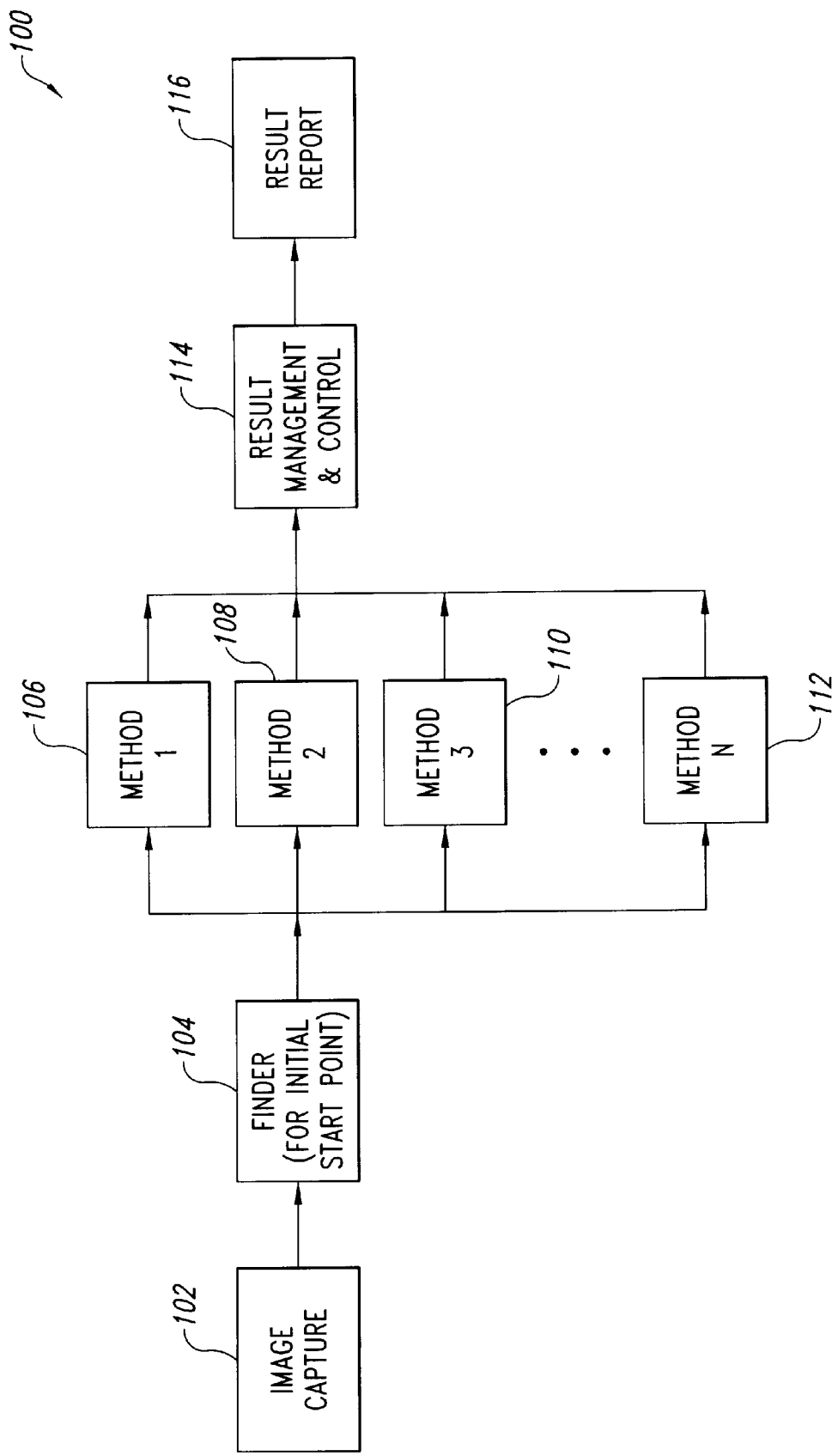
FIG. 3 is a flow diagram of a basic method for locating, sampling, processing and decoding a symbol stored by the symbology reader of FIG. 1 or FIG. 2.

Referring to FIG. 3, a routine 100, executed by the CPU 14, or divided among the CPUs 14', reads an image of a data collection symbol within the memory 16 of the symbology reader 10. The routine 100 is preferably performed with one or more high-speed CPUs, and in readers having two-dimensional sampling of pixels within a stored image. However, the present invention can also be employed with laser scanner readers, pen-based readers, and other known machine-readable symbol readers. The routine 100, and all the routines and methods described herein, are permanently stored within the non-volatile memory portion of the memory 16.

As explained below, the routine 100 employs multiple reading methods. Each of the CPUs 14' in the reader 10' can be assigned to one of the reading methods. Alternatively, the single CPU 14 in the reader 10 can operate under a multi-tasking or related environment to perform each of the reading methods substantially simultaneously. Much of the description of the present invention is described below with respect to only the single CPU reader 10 of FIG. 1. However, unless otherwise noted herein, the description applies equally to the multiple CPU reader 10 ' of FIG. 2.

The routine 100 of FIG. 3 can be viewed as a set of "virtual processors" where each processor represents a particular method to solve the same problem (reading a machine-readable symbol). In other words, the CPU 14 decodes or attempts to decode a given machine-readable symbol under multiple reading methods. The result of each of these reading methods, or the answer to the problem from each virtual processor, is fused in an inference processor. The inference processor correlates the outputted data and selects an optimal answer from among the various answers provided. The selected answer is preferably based on a weighting system, where each virtual processor's answer is given a metric weight. The metric weight could be determined based on a variety of factors, such as a prioiri knowledge about the data collection environment/machine-readable symbology, statistical properties of each reading method, operating efficiency of each reading method (e.g., speed at producing a correct answer), a confidence level of an answer, or simple majority vote of answers provided. In any case, the inference processor ultimately chooses an answer based on the weighting criteria. For example, if there exists a checksum, the inference processor will choose the first answer coming out of the group of methods.

The routine 100 begins in step 102, where the CPU 14 produces one or more signals based on light reflected from a symbol, and stores the signals as an image or partial image of the symbol. As explained herein, various methods and apparatus for receiving light reflected from the symbol and producing signals therefrom are known to those skilled in the art. In an exemplary embodiment, the reader 10 produces an image signal representing the entire symbol and field of view of the reader, which is stored in the memory 16. As used herein, the term "stored image" generally refers to the overall image of the field of view stored in memory 16 that has been produced by the area imager and the CPU 14, and which contains the symbol or symbols to be read.

The memory 16 includes for processing efficiency an array of memory locations addressed by the CPU 14 that correspond to and represent the pixels in the field of view of the CCD array. The stored image is referenced by a Cartesian coordinate system so that the location of each pixel is represented by a pair of numbers indicating the horizontal and vertical position of the pixel in the stored image. Therefore, objects within the stored image, i.e., areas or groups of pixels, lines/paths formed therethrough, etc., can be arithmetically determined using known geometric and trigonometric properties based on the coordinate system (e.g., by equations of lines, trapezoids, or other geometric or trigonometric equations used for representing planar objects).

In step 104, the CPU 14 determines the location of a symbol in the stored image using known techniques such as by using virtual scans of or several sampling paths through the image in the memory 16. The CPU 14, in step 104, locates at least one bar or space in the symbol. Alternatively, the CPU 14 can locate a "defined portion" of a symbol in a given symbology that is unique for that particular symbology. During step 104, the CPU 14 also locates and stores in the memory 16 the Cartesian coordinates of a starting point of each symbol located in the stored image. For a linear symbology, the starting point is preferably a point along an edge between a bar or a space in the symbol, and can be a point along the edge of the outermost bar in the start or stop pattern for the symbol, adjacent to the quiet zone. However, the starting point can be located anywhere within the symbol.

In steps 106–112, the CPU 14 performs multiple reading methods, subroutines, or portions thereof for the stored symbol image. Each of the reading methods can be directed to a particular result. For example, the reading method performed under step 106 can be a simple, rapid method for decoding the symbol image if the image or symbol has no damage or distortion. Such a simple, rapid reading method can be the conventional reading method employed for a particular symbology. Under such a simple reading method, the CPU 14 finds the height of a bar adjacent to the starting point located under step 104. The CPU 14 then determines an orientation of the bar within the stored image. Thereafter, the CPU 14 samples along an orientation, preferably perpendicular to the located bar, to collect a waveform or profile of the bars and spaces in the symbol. The CPU 14 then processes and decodes the resulting waveform. As a result, the reader 10 under step 106 can quickly decode the stored symbol image if the image or symbol suffers from no damage or distortion.

The reading method performed under step 106 preferably handles the ideal situation where the symbol suffers from no damage, is positioned on a planar surface, and the symbol image produced therefrom contains no distortion and provides sufficient contrast between bars and spaces. As a result, the reading method under step 106 will likely rapidly decode the symbol image for over 80% of symbols read by the reader 10, assuming such ideal conditions occur regularly. Consequently, the routine 100 can be quickly performed for a majority of the symbols read.

If the reading method under step 106 fails, however, then one of several alternative methods, each of which attacks a separate problem, will likely decode the symbol image successfully. Symbols often suffer from damage due to printing defects, surface distortions, surface damage, are optically distorted as stored within the memory 16, are imaged or sampled beyond a resolution of the reader 10, etc. Therefore, under the remaining steps 108–112, the CPU 14 can employ methods for reading the symbol image when the symbol or symbol image suffer from distortions. As generally used herein, a symbol or stored image suffers from "distortions" if it contains or suffers from damage, spots or voids, printing defects, optical or perspective distortions, surface distortions (e.g., when placed on a non-planar surface), resolution distortions, noise, or any other defects, damage or distortions which cause the symbol or the symbol image to deviate from an ideal symbol/image.

Under step 108, the CPU 14 employs a method of reading the symbol image if it suffers from spots or voids. Spots or voids can be caused by printing defects, damages and/or smearing of the bar code surface. Additionally, optical reflection can cause blankout or voids in portions of the symbol image, which results in the loss of certain portions of bar and space information in the symbol. Such a reading method is described in detail in the inventors' U.S. patent application Ser. No. 08/554,184, entitled "Problem Reduction With Low-Level Information Integration in Bar Code Decoding," filed Nov. 6, 1995 ("the '184 application"). Under this reading method, the CPU analyzes and decodes each symbol character or code word in the symbol image along a path beginning at the start of the symbol image and moving toward the end of the image. As each code word is decoded, the CPU 14 stores the decoded data in the memory 16. When the CPU 14 encounters an invalid code word, the CPU continues decoding along a path beginning at the( end of the symbol image and moving toward the start of the image, and the decoded data is stored in the memory 16 with the previously decoded data. When the CPU encounters an invalid code word again, the CPU 14 moves the current scan path upward or downward, parallel with the bars, and continues decoding along a new scan path beginning at a last valid code word that has been decoded while moving toward the end of the image. Further details on this method are described in detail in the above application.

Under step 110, the CPU 14 performs a method that compensates for perspective and other geometric distortions that are caused by imaging the symbol where the reader 10 is not positioned perpendicular to the surface on which the symbol is located. As a result, the stored image can have a trapezoidal shape. Alternatively, the surface on which the symbol is located can have distortions extending in three dimensions (i.e., the surface is not flat). As a result, X-dimensions of common elements can vary greatly, and elements can be curved or distorted, or even lost. As a result, the CPU 14 in step 110 performs a routine such as one of the, co-inventors' U.S. patent application Ser. No. 08/731,274, entitled "Method and Apparatus for Reading Machine-Readable Symbols Having Surface or Optical Distortions," filed Oct. 11, 1996 ("the '274 application"). Under this method, the CPU 14 identifies edge contours of some or all of the bars and spaces in the symbol image. The CPU 14 then identifies one or more points within each of the identified edges. Thereafter, the CPU 14 defines one or more sampling paths or lines that extend through the symbol image, and through the points, such that each line is connected in a "connect-the-dot" fashion. The CPU 14 then samples the bars and spaces based on one or more of the defined lines, and decodes the information in the symbol from the sampled bars and spaces. More details on this method are found in the above application.

Under step 112, the CPU 14 compensates for symbol images having low contrast or modulation between the narrow bars and spaces as compared with the wide bars and spaces. In other words, such symbol images fail to resolve the narrow bars and spaces ("elements") in the symbol. As a result, the CPU 14 under step 112 performs a method to decode such an unresolved symbol image using one or more of the following patents or U.S. patent applications assigned to the assignee of the present invention: U.S. Pat. No. 5,389,770, entitled "Method and Apparatus for Decoding Unresolved Bar Code Profiles," issued Feb. 14, 1995; U.S. Pat. No. 5,486,689, entitled "Method and Apparatus for Decoding Unresolved Multi-Width Bar Code Symbology Profiles," issued Jan. 23, 1996; U.S. Pat. No. 5,514,858, entitled "Method and Apparatus for Decoding Unresolved Complex Multi-Width Bar Code Symbology Profiles," issued May 7, 1996; U.S. Pat. No. 5,539,191, entitled "Method and Apparatus for Decoding Unresolved Bar Code Profiles Using Edge Finding Circuitry," issued Jul. 23, 1996; and/or U.S. patent application Ser. No. 08/730,474, entitled "Method and Apparatus for Enhancing Resolution of Reflectance Signals Produced from Machine-Readable Symbols," filed Oct. 12, 1996 (collectively "the unresolved symbol processing techniques") now U.S. Pat. No. 5,539,191. In general, many of such patents employ a method which first begins where the CPU 14 identifies which elements in the symbol image, or profile produced therefrom, are resolved. Second, the CPU determines distances between the centers of the resolved elements. Third, the CPU 14 determines closure boundaries or thresholds, and widths of the result elements; at the closure boundaries. The CPU 14 determines the type of resolved element (e.g., 2-wide bar, 3-wide space, etc.) based on its measured width. Thereafter, the CPU 14 determines a unit distance for 1-wide narrow elements unresolved in the profile, based on the unit distance and the width of two adjacent resolved elements, the CPU 14 constructs a matrix for determining the number of narrow elements unresolved between two resolved elements. Based on the measured centers distances, the resolved element widths and the matrix, the CPU 14 identifies all unresolved narrow elements in the profile and the profile is subsequently decoded. Additional details are found in the above patents or applications.

The CPU 14 under steps 106–112, preferably shares searching resources or other operations under each reading method. For example, the reading methods under steps 108 and 110 differ mainly in the way they process the stored image to derive one or more sampled waveforms therefrom. However, the reading methods under steps 108 and 110 share the same decoding procedure. As a result, the CPU 14 shares the same decoding procedure for the reading methods under steps 108 and 110, rather than storing in the memory 16, and employing, two separate decoding processes for steps 108 and 110.

While only four reading methods are described above for steps 106–112, the CPU 14 under the exemplary routine 100 can employ fewer or one or more additional reading methods to compensate for other damage, defects or optical distortions, or be directed to solving other problems in decoding the symbol image, such as under several other reading methods described herein. Additionally, while the four reading methods described for steps 106–112 under the, routine 100 are generally described herein as reading linear symbols, these methods, as well as other methods, can be adapted or employed to read area or stacked symbologies.

In step 114, the CPU 14 receives the signals or data output from the reading methods performed under steps 106–112. Such output data typically includes the decoded data that was originally encoded in the symbol image. The output data can differ between the methods 106–112. Therefore, the CPU 14 in step 114 determines which of the output data from steps 106–112 is correct or will be output to the user of the reader 10. If the symbol being read includes error detection/correction characters, then the CPU 14 outputs in step 114 the first received output data from steps 106–112 where the error detection/correction symbols indicate that no error exists. For example, if the symbol includes a check sum character, and the reading method under step 106 first outputs data to the CPU 14, then the CPU in step 114 then performs an appropriate check sum routine on the output data. If the check sum checks, then the CPU 14 outputs the decoded data produced from the reading method under step 106.

If the check sum fails to check on all of the output data, then the CPU 14 attempts to combine the results of one or more decoded symbol characters from the methods under the steps 106–112 to attempt to derive a fully decoded symbol which satisfies the check sum. If the symbol lacks error detection/correction characters, then the CPU 14 can perform various known arbitration schemes, such as a majority vote, to determine which of the methods under the steps 106–112 output the correct decoded data from the symbol image. For example, if three of the four methods under steps 106–112 output the same data, then this data is output to the user as the data originally encoded in the symbol.

If the routine 100 is performed in the reader 10, having only the single CPU 14, then the CPU prioritizes the reading methods performed under steps 106–112. The prioritization system can include such factors as the environment in which the reader 10 is employed (e.g., whether accurate reading is required over speed in decoding), whether symbols are frequently formed on non-planar surfaces, whether symbols are frequently placed on noisy backgrounds or have low contrast, etc. As a result, if only two of the steps 206–212 output data, and no error detection/correction characters exist, then the CPU 14 under step 114 selects the data output from the higher priority reading method.

Under step 114, the CPU 14 also performs any necessary management operations to resolve time and reading conflict issues between the various methods under steps 106–112. As noted above, the method under step 106 is preferably a quick method of reading the symbol image. As a result, the method under step 106 will be performed more rapidly than the reading methods under steps 108–112. In general, each of the reading methods performed by the CPU 14 will output decided data to the CPU 14 at different rates. Therefore, the CPU 14 in step 114 stores the decoded data output from each of the methods under the steps 106–112 as each of these methods complete operation.

The CPU 14, for example, initiates a counter or timer after completing step 104. In step 114, the CPU 14 then continually compares a value of the timer to a maximum time limit. The CPU 14 waits until either all of the methods under the steps 106–112 have been completed, or the timer reaches the maximum time limit (or times out). Any method under the steps 106–112 that is still running is terminated. The CPU 14 then determines from the output of the remaining reading methods which decoded data is correct and to be output to the user. The maximum time limit is preferably a user-adjustable value, which can depend upon the processing power of the reader 10, an application in which the reader 10 is to be employed, etc.

In step 116, the CPU 14 outputs the selected output data to the user of the reader 10. Alternatively, the CPU 14 in step 116 posts the decoded data over a preferred link, such as a RS232 link. The CPU 14 in step 116 can also provide a particular output of data to the user, such as a partial decode of the symbol, or a particular ordering of output data if two or more symbols are within the stored image, and which have been decoded by the reader 10.

Figure 4:
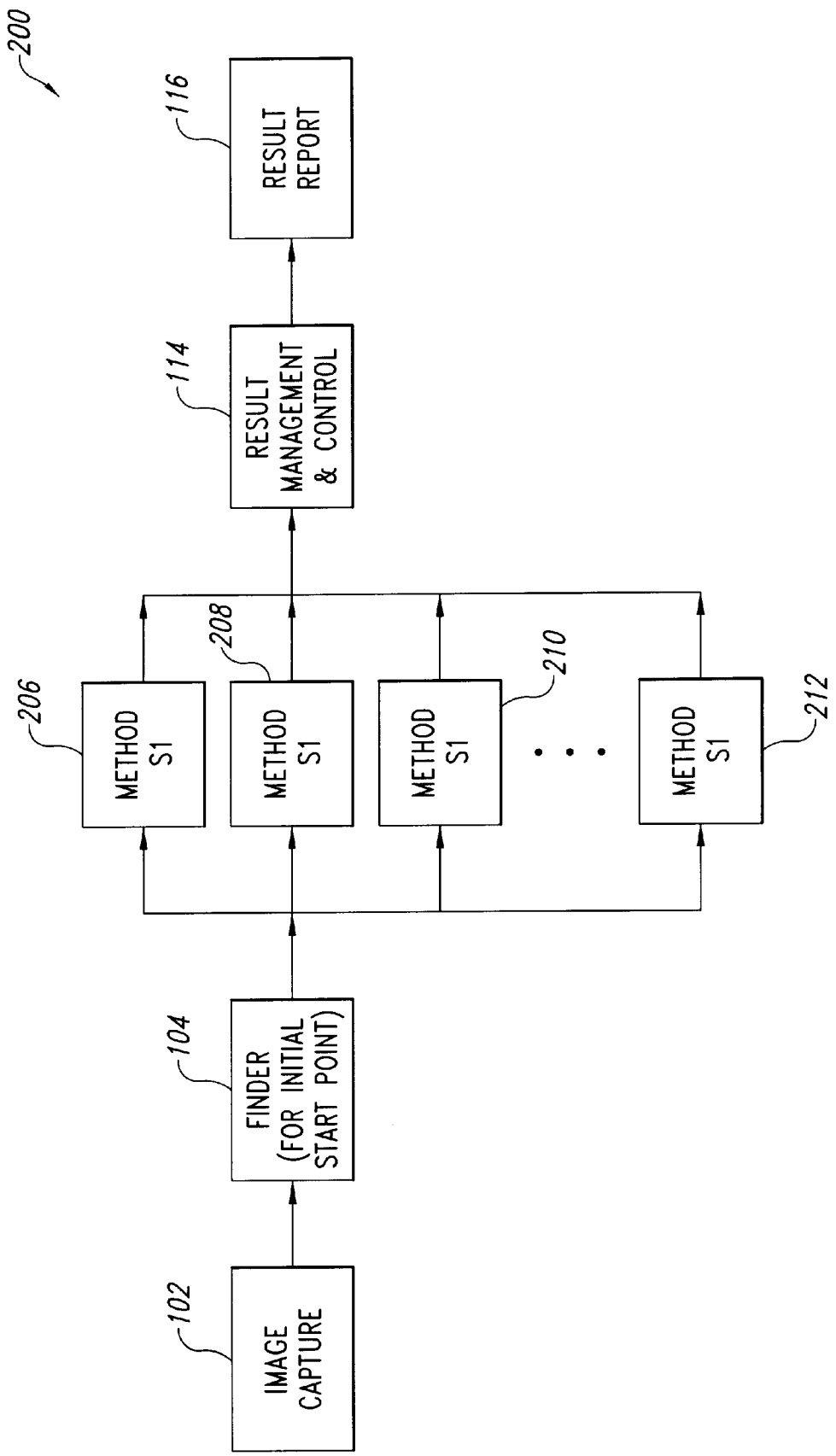
FIG. 4 is a flow diagram of a first alternate embodiment of the method of locating, sampling, processing and decoding of FIG. 3.

As shown in FIG. 4, an alternative embodiment under the present invention employs a routine 200 that includes steps that are similar to routine 100 of FIG. 3. This alternative embodiment, and those described herein, are substantially similar to previously described embodiments, and common steps are identified by the same reference numbers. Only the significant differences in operation are described in detail.

As shown in FIG. 4, the CPU 14 under steps 102 and 104 of the routine 200 capture and store an image of a symbol, and find a starting point within the stored image. Thereafter, in steps 206, 208, 210 and 212, the (CPU 11 performs the same reading method, but at different locations within the symbol image. The particular reading method employed under the steps 206–212 is preferably selected as a reading method for a particular problem or a rigorous reading method that can compensate for various types of damage, defects, optical distortion, or other distortions. For example, under step 206, the CPU 114 performs the reading method from left to right across the symbol image, beginning at the left edge of the symbol image. Conversely, under step 208, the CPU 14 performs the same reading method but in reverse, beginning at the right edge of the symbol and moving leftward. Under the remaining steps, the CPU 14 performs the same reading method, but at selected locations within the middle of the symbol image, preferably not co-linearly with the sampling and processing performed under any of the steps 206, 208, etc. As a result, the CPU 14 under steps 206–212 produces strings of decoded symbol characters from the symbol image, only some of which are correct if the symbol or symbol image suffers from damage or distortion.

Under step 114, the CPU 14 analyzes the data output from each of the steps 206–212. If the symbol image suffers from significant distortions, the CPU 14 can construct a resulting string of decoded symbol characters for the entire symbol by selecting appropriate strings of decoded symbol character output from steps 206–212. For example, if the symbol image includes a string of twelve symbol characters for a linear symbol, step 206 may correctly decode the first four symbol characters, but fail to decode the remaining symbol characters due to damage along the sampling path analyzed under step 206. Step 208 may correctly decode the last six symbol characters for the symbol image, because the sampling path performed under step 208 is laterally displaced from the sampling path analyzed under step 206, and thus avoids certain distortions in the symbol image. Steps 210 and 212 correctly decode the fourth through seventh and sixth through tenth symbol characters, respectively. Based on the four resulting strings of decoded symbol characters, the CPU 14 in step 114 can determine the entire string of twelve decoded symbol characters therefrom.

Alternatively, the routine 100 can likewise be employed at selected locations in the stored image, but with the multiple reading methods. Additionally, portions of the output data from the multiple reading methods under the routine 100 can be combined to produce a complete decoded signal.

Figure 5:
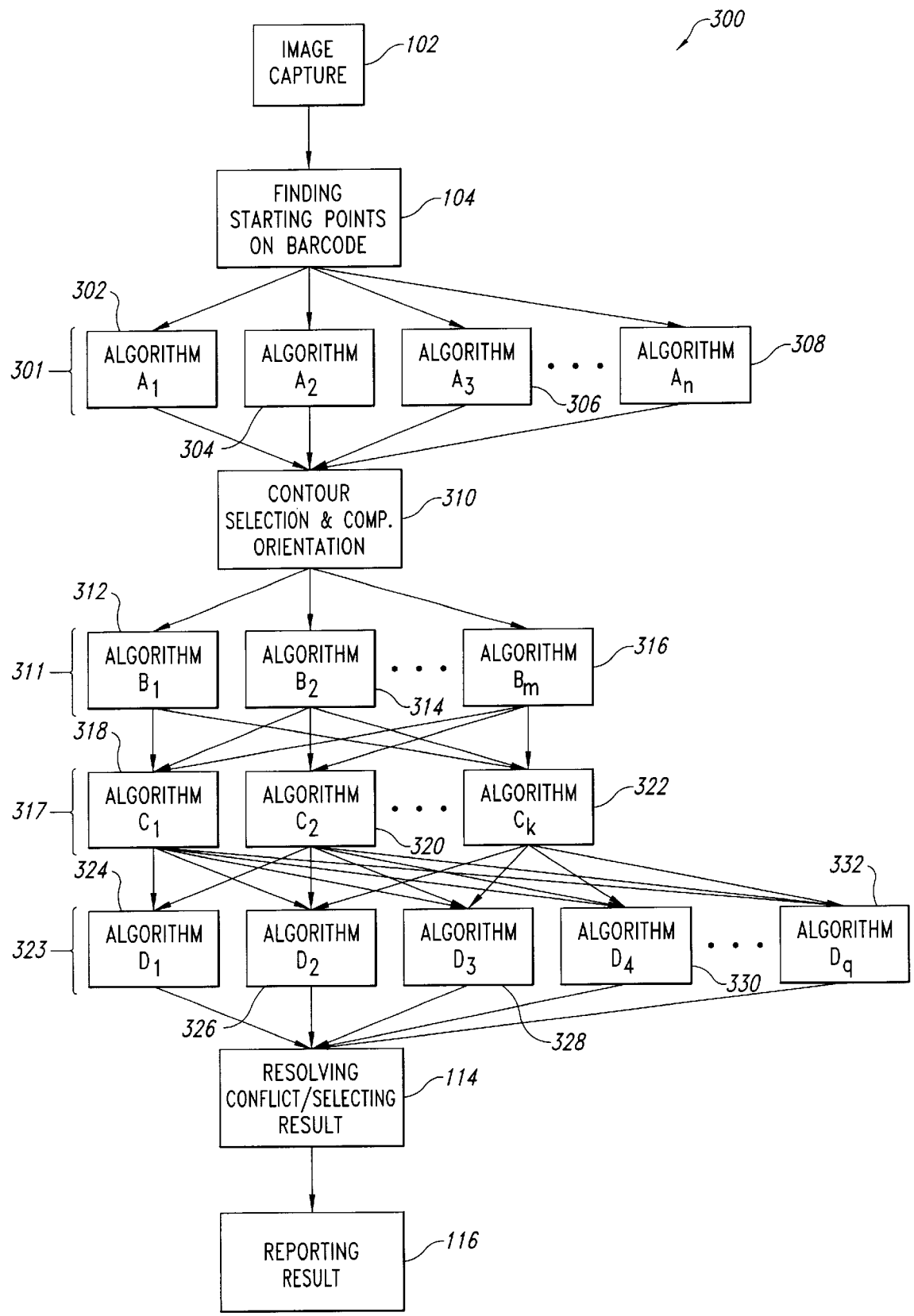
FIG. 5 is a flow diagram of a second alternate embodiment of the method of locating, sampling, processing and decoding of FIG. 3.

Referring to FIG. 5, a second alternative embodiment under the present invention is shown as a routine 300. Again, the CPU 14 captures and stores an image of the symbol and determines a starting point within the symbol image under steps 102 and 104. Thereafter, the CPU 14 performs sets of task units or modules selected from various reading methods. The inventors have discovered that all reading methods include one or more individual modules, such as locating a portion of a bar contour in the symbol image, producing a sampled waveform from the symbol image, processing the waveform, decoding the waveform, etc. As generally used herein, the term "module" refers to a logic grouping of instructions that perform a given functionality. Under the routine 300, each reading method is broken down into its constituent parts or modules, and each module is grouped into sets and performed with like modules. Therefore, FIG. 5 shows a network of such modules. Any path from top down, with one unit from each logic group, constructs a reading method.

The routine 300 applies a metric to each module which allows the routine to measure a contribution of the module to the overall probability of reading the stored image. The CPU 14 performs each set of modules substantially simultaneously. The routine 300 assigns a particular thread or path through each set of modules dynamically, or based on a priori knowledge that can be derived, for example, based on empirically derived data. Each thread through sets of modules can be selected to further enhance the reader's probability of reading the stored image based on multiple samples of the stored image. Multiple samples of the stored image can be derived by a multi-path sampling laser scanner, or by sampling redundancy in a stored two-dimensional image. In one exemplary embodiment, reading methods having similar functions are classified or grouped as to their effect in certain environments. Therefore, rather than selecting a single best algorithm for a particular function (such as under the routine 200), the routine 300 selects a best set of methods to represent the di,sired function, where each method may have overlapping and unique capabilities at solving the desired problem, and which amplify the probability of detection over use of the single reading method.

In another exemplary embodiment, the CPU 14 performs multiple predetermined threads through selected combinations of modules. Each predetermined thread performs an overall reading method that is directed to a particular problem. For example, one predetermined thread can decode symbols positioned on noisy backgrounds, while another predetermined thread can decode noisy symbols positioned on noiseless backgrounds. Other predetermined threads are similarly employed to compensate for, and produce output data from, symbols suffering from a variety of distortions, or environments or applications in which the reader 10 is employed.

As shown in FIG. 5, a first set of modules 301 are directed to finding a contour of a bar in the stored image under steps 302–308. In step 302, the CPU 14 performs a sequential linking of pixels along an edge between the bar and space, beginning with a starting point located in step 104. Sequential linking of adjacent pixels along an edge in a stored image is described in the '184 application, and in U.S. patent application Ser. No. 08/607,100, entitled "Method and Apparatus for Accurately Locating Data Regions in Stored images of Symbols," filed Feb. 26, 1996 ("the '100 application").

In step 304, the CPU 14 performs a module that performs a similar sequential linking task to locate the center points through a bar located under step 104. The task of locating center points extending longitudinally through a bar is described, for example, in the '184 application. In step 306, the CPU 14 determines a gradient direction or direction of greatest pixel intensity change from the starting point, and then moves or jumps several pixels to a new point in a direction perpendicular to the gradient direction. At the new point, the CPU 14 analyzes a neighborhood of pixels (e.g., a 3×3 pixel neighborhood) for an edge contour. The CPU 14 continues to move or jump and locate an edge point as it locates an edge of a bar in the stored image. Such a task of moving or jumping between edge points and analyzing a neighborhood surrounding an edge point is described, for example, in the '100 application.

Under step 308, the CPU 14 performs other known methods of finding contour of a bar (or space) in the symbol image. For example, the CPU 14 measures cross-correlations of intensity values (short waveforms) to track an edge between a bar (low intensity) and space (high intensity). If the correlation falls below a threshold, the CPU 14 is outside of the tracked edge. The CPU 14 can perform other tasks for locating a bar in the symbol image under the finding set of modules 301. For example, the CPU 14 can perform portions of the method disclosed in U.S. patent application Ser. No. 08/687,659, entitled "Time-Efficient Method of Analyzing Imaged Input Data to Locate Two-Dimensional Machine-Readable Symbols or Other Linear Images Therein," filed Jul. 26, 1996, and assigned to the assignee of the present invention. Under this method, the CPU 14 identifies elongated edges based on one or more initial starting points, and the CPU analyzes the elongated edges for parallelism and minimum length to filter out any spurious detected edges. Thereafter, the CPU 14 analyzes the edges to confirm that a start or stop pattern has been located for the symbol image. Further details on this method are found in the above application.

In addition to finding a bar in the symbol image, the CPU 14 in step 308 (or another step) can locate a predetermined pattern, such as a finder pattern, in the symbol image. For example, the CPU 14 in step 308 locates the center "bull's eye" finder pattern in stored images of Maxicode symbols under U.S. patent application Ser. No. 08/602,624, entitled "Method and Apparatus for Locating and Decoding Machine-Readable Symbols," filed Feb. 16, 1996 and assigned to the assignee of the present invention ("the '624 application"). Under the '624 application, the CPU 14 locates all Jordan curves having an angular length less than $\pi$ within the symbol image. The CPU 14 selects all convex Jordan curves from the set of all Jordan curves found within the symbol image and determines equations of a pair of tangent lines from endpoints of each convex Jordan curve. The CPU 14 determines an equation of a center line for each pair of tangent lines, and determines a point of intersection of the center lines. Based on the point of intersection, the CPU 14 locates a center point of a finder pattern for the Maxicode symbol.

Another method of locating the center point of the center finder pattern of a Maxicode symbol is described in U.S. patent application Ser. No. 08/549,916, entitled "Method and Apparatus for Locating and Decoding Machine-Readable Symbols," filed Oct. 30, 1995. Under this method, the CPU 14 in step 308 selects characteristic or critical points along a sampling path extending through the symbol image, including maximum and minimum points of peaks and valleys in the waveform produced from the sampling path. Distances between the centers of peaks and valleys are determined, and the CPU 14 locates the finder pattern by locating a predetermined series of measured distances, such as a series of adjacent, substantially equal distances. Additional details on locating the center finder patterns for Maxicode symbols are found in this and in the '624 applications.

To locate the solid and dashed boundaries of the finder pattern for data matrix symbols, the CPU 14 in step 308 performs a method such as is described in U.S. patent application Ser. No. 08/654,925, entitled "Method and Apparatus for Locating and Decoding Machine-Readable Symbols, Including Data Matrix Symbols," filed May 29, 1996. Under this method, the CPU 14 locates at least portions of first and second solid boundaries, and preferably a solid corner therebetween. Thereafter, the CPU 14 locates at least portions of dashed boundaries extending from the free ends of the solid boundaries. Additional details regarding this method are found in the above application.

To locate the center finder pattern for Code One symbols, the CPU 14 performs a method such as is described in the '100 application. Under this method, the CPU 14 locates positions of landmark points within the stored image, where the landmark points include points at the ends of the longitudinally extending bar, points at the corners or roots formed between the longitudinally extending bar and the vertically extending bars, points at the ends of the vertically extending bars, and points at the intersection between the bars and blocks that extend transversely therefrom in the center finder pattern. Further details on this method are described in detail in the '100 application.

In step 310, the CPU 14 selects one of the contours determined under steps 302–308, and determines an orientation of the symbol image within the stored image. Under step 310, the CPU 14 can employ some of the same techniques employed under step 114. For example, the CPU 14 can select the first contour to be fully identified under one of the steps 302–308. Alternatively, the CPU can select the contour produced by the highest priority task in the finding set of modules 301. Based on the selected contour, the CPU 14 determines an orientation of the symbol image within the stored image by performing various techniques, such as those described in the patents and applications listed above with respect to the set of finding modules 301.

Based on the selected contour and determined orientation of the symbol image, the CPU 14 in steps 312–316 performs a set of sampling modules 311 to determine a sampling path through the symbol image and produce a waveform or profile therefrom. In one exemplary embodiment, threads through all combinations of modules in the routine 300 are employed, and thus the CPU 14 processes each waveform sampled in steps 312–316 under each processing module in steps 318–322. As a result, one of the steps 318–322 may quickly and accurately process a given sampled waveform, but more slowly or fail to process a sampled waveform from another module in the set of sampling modules 311. Under step 312, the CPU 14 simply selects a sampling path perpendicular to the selected contour. If the symbol image lacks any defects or optical distortions, then the sampling path under step 312 extends through the entire symbol image, perpendicular to the bars and spaces therein. The intensity values of the pixels along the sampling path are stored in a one-dimensional array in the memory 16 for later processing by the CPU 14. As a result, under step 312, thee CPU 14 can rapidly sample and produce an accurate waveform therefrom if the symbol image lacks any distortions.

At times, however, the symbol image will suffer from distortions, as noted above. Therefore, under step 314, the CPU 14 performs a method to enhance resolution of a waveform produced from the symbol image by, for example, performing the method described in the co-inventors' U.S. patent application Ser. No. 08/515,035, entitled "Resolution Gain on Width Modulated Bar Codes By Use of Angled-Sampling in Two Dimension," filed Aug. 14, 1995. Under this method, the CPU 14 measures the spacing between adjacent bar and space elements by sampling along a diagonal line segment that intersects the adjacent elements. Such diagonal sampling allows a greater number of pixels to be included in the measurement than if the sampling path extended straight through the symbol image. Further details on this method are found in the above patent.

If the symbol suffers from spots, voids, or where the symbol is placed on a non-planar surface, or suffers from optical distortions, then the CPU 14 performs a sampling and waveform producing method such as is described in the '274 application, which is described above with respect to step 110 (FIG. 3).

After sampling the symbol image and producing waveforms therefrom, the CPU 14 employs the resulting waveforms from each of the steps 312–316 in each of separate waveform processing modules in a set of processing modules 317. In step 318, the CPU 14 performs a simple comparison of each pixel in the waveform to a threshold value to determine whether the pixel corresponds to a white, or a black value (a bar or a space). Again, such a quick comparison of each pixel to a threshold provides a rapid processing of each waveform produced under steps 312–316, and thus could provide a quick processed waveform if the symbol image lacks any distortions.

In step 320, the CPU 14 applies interpolation to each pixel or group of pixels to increase resolution of the waveform. For example, the CPU 14 can apply a fixed weighting or factor to increase the widths of each pixel. If the narrow bars and spaces in the waveform consist of only three pixels each, then the CPU 14 can add two additional pixels to each of such narrow elements. Two pixels are likewise added to pixels representing wider elements in the waveform. Thereafter, the resulting weighted pixel string is compared to an appropriate threshold to determine whether each pixel corresponds to either a bar or space in the symbol image.

In step 322, the CPU 14 performs one or more of the unresolved symbol processing techniques described above. In addition, the CPU 14 in the set of processing modules 317 can perform additional modules to process the waveforms produced under steps 312–316, such as performing known filtering methods to remove any noise in the waveforms.

For example, the CPU 14 in the set of processing modules 317 performs module that samples the symbol image under one of the above techniques, but then processes the sampled waveform in groups. If the symbol is optically distorted to such an extent that the widths of the individual bars and spaces increase from left to right, the CPU 14 processes the waveforms in groups, where each group consists of bar and space patterns for a symbol character. Distortions within a given symbol character are generally much less than the distortions along an entire symbol or row. The Factor R algorithm is a standard processing technique for Code 39 symbols where each set of five bars and spaces corresponds to one symbol character (and thus one data character). Under the Factor R technique, each set of five bars and spaces is measured and adjusted for distortions within that particular character, thus processing each symbol character by character. The Factor R algorithm compensates for acceleration distortions caused by manually scanning a symbol by a scanning wand. The acceleration distortions caused by manually scanning a symbol are similar to varying bar/space widths encountered by optical or perspective distortions. Therefore, the Factor R algorithm is similarly used to compensate for varying widths of individual bars and spaces along a given row 131. For PDF417 symbols, the CPU 14 compares the length of the leading edge of the first bar to the leading edge of the second bar, and the length of the trailing edge of the first bar to the trailing edge of the second bar for each character, and both lengths are compared to the total length for the given character to determine an amount of adjustment for any distortions in width. Other acceleration distortion techniques can similarly be employed by the CPU 14 in the set of processing modules 317.

After processing each of the waveforms in steps 318–322, the CPU 14 decodes each of the processed waveforms in steps 324–332 in a decoding set of modules 323. Again, if all threads employing all combinations of modules in the sets of modules 311–323 are employed, then a given decoding technique can quickly decode a given processed waveform from one of the steps 318–322, but more slowly or fail to decode a processed waveform from one or more of the other steps. In step 324, the CPU 14 performs a standard decode algorithm for a particular symbology. Code 93, UPC, PDF417 and other symbologies employ standard decode algorithms set forth in official publication standards for the given symbology.

In step 326, the CPU 14 adds the lengths of each bar and space pair, and decodes each waveform based on such addition. In step 328, the CPU 14 analyses each bar and space detected in each processed waveform. Thereafter, each bar and space is grouped to determine symbol characters, which are then subsequently individually decoded.

Under the decoding set of modules 323, the CPU 14 can also perform error detection and/or correction techniques. For example, in step 330, the CPU 14 can perform the technique described in U.S. patent application Ser. No. 08/679,657, entitled "Fast Fourier Transform in Galois Field For The fast Decoding Of PDF417 Symbology," filed Jul. 12, 1996, and assigned to the same assignee as the present invention. Under this method, the CPU 14 performs an error correction routine that includes a two-dimensional discreet Fourier transform with a reduced number of arithmetic operations. The transform is a variant of the Good-Thomas fast Fourier transform performed over a Galois field GF(929), and includes a set of first index values consisting of integers from 0 to 28 inclusive and a second set of index values consisting of integers from 0 to 31 inclusive. For a given index value, the CPU 14 performs the transform over only a subset of the second index values. Additional details regarding this technique are described in the above patent.

Under step 323, the CPU 14 performs other error detection/correction methods, such as described in U.S. Pat. No. 5,553,084, entitled "Error Correction Enhancement For Code One And Other Machine-Readable Symbologies," issued Sep. 3, 1996, and assigned to the same assignee as the present invention. Under this method the CPU 14 first determines that a processed waveform cannot be decoded. The CPU 14 then determines whether the symbol image has at least one damaged pad character. If so, the CPU 14 locates at least two consecutive pad characters in the symbol image. The CPU replaces any damaged pad characters thereafter throughout the symbol image and it then again attempts to decode the processed waveform after the pad characters have been replaced. Further details regarding this technique are described in the above patent.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other machine vision systems, not necessarily the exemplary data collection symbology reader described above. Various exemplary reading methods, modules, and other techniques for reading data collection symbols have been described above, and accordingly, various other reading methods, modules, etc. can be employed under the present invention and a greater or lesser number of steps/ modules can be employed. For example, the routine 300 can employ other modules, in addition to, or in lieu of, the above described modules, and the present invention can employ a greater or lesser number of modules in each set of modules. As another example, the present invention can employ multiple finding modules under step 104 of the routine 300 (or routines 100 or 200) to locate an initial starting point within the symbol image.

All of the above U.S. patents and applications are incorporated herein by reference as if set forth in their entirety. While the present invention reads an image of a data collection symbol, the present invention can similarly read visual indicia of other stored images.

These and other changes can be made to the invention in light of the above detailed description. In general, in the following claims, the terms used should not be construed to limit the invention to the specific embodiments disclosed in the specification and the claims, but should be construed to include all machine vision systems that operate in accordance with the claims to provide a method for accurately reading visual indicia. Accordingly, the invention is not limited by the disclosure, but instead its scope is to be determined entirely by the following claims.

What is claimed is:

1. In a symbol reading apparatus, a method of reading a data collection symbol, the symbol having a plurality of shapes and spaces between the shapes that encode data, the shapes and spaces being arranged along at least one axis, the method comprising:

storing a two-dimensional image of the symbol based on light reflection from the shapes and spaces of the symbol;

locating a portion of the symbol as a starting point based on the stored image;

substantially simultaneously performing a plurality of symbol reading subroutines based on the stored image and the located portion;

processing a plurality of output signals produced from each of the symbol reading subroutines;

providing a decoded signal that represents the data encoded in the symbol based on the plurality of processed output signals;

wherein substantially simultaneously performing a plurality of symbol reading subroutines includes substantially simultaneously performing a plurality of different symbol reading methods based on the stored image and the located portion, wherein each of a plurality of different symbol reading methods has a priority, and wherein processing a plurality of output signals includes selecting the output signal produced by a highest priority symbol reading method.

2. The method of claim 1 wherein substantially simultaneously performing a plurality of symbol reading subroutines includes substantially simultaneously performing a pluralities of different symbol reading methods based on the stored image and the located portion, and wherein one of a plurality of different symbol reading methods is a rapid method of reading the symbol when the symbol lacks any defects or damage.

3. In a symbol reading apparatus a method of reading a data collection symbol, the symbol having a plurality of shapes and spaces between the shapes that encode data, the shapes and spaces being arranged along at least one axis, the method comprising:

storing a two-dimensional image of the symbol based on light reflected from the shapes and spaces of the symbol;

locating a portion of the symbol as a starting point based on the stored image;

substantially simultaneously performing a plurality of symbol reading subroutines based on the stored image and the located portions;

processing a plurality of output signals produced from each of the symbol reading subroutines;

providing a decoded signal that represents the data encoded in the symbol based on the plurality of processed output signals; and wherein substantially simultaneously performing a plurality of symbol reading subroutines includes performing a plurality of symbol reading modules, wherein the symbol reading modules are each grouped within one of a set of symbol locating modules, set of symbol sampling and profile producing modules, set of profile processing modules and set of decoding modules, and wherein each symbol reading subroutine includes one module from each set of modules.

4. In a symbol reading apparatus, a method of reading a data collection symbol the symbol having a plurality of shapes and spaces between the shapes that encode data, the shapes and spaces being arranged along at least one axis, the method comprising:

storing a two-dimensional image of the symbol based on light reflected from the shapes and spaces of the symbol;

locating a portion of the symbol as a starting point based on the stored image;

substantially simultaneously, performing a plurality of symbol reading subroutines based on the stored image and the located portion;

processing a plurality of output signals produced from each of the symbol reading subroutines;

providing a decoded signal that represents the data encoded in the symbol based on the plurality of processed output signals; and wherein substantially simultaneously performing a plurality of symbol reading subroutines includes performing a plurality of predetermined threads through a plurality of symbol reading modules, wherein the symbol reading modules are grouped within sets of modules having common functionality, and wherein at least some of the predetermined threads include a selected module in each set of modules to solve a predetermined error to which the symbol may suffer.

5. In a symbol reading apparatus, a method of reading a data collection symbol, the symbol having a plurality of shapes and spaces between the shapes that encode data, the shapes and spaces being arranged along at least one axis, the method comprising:

storing a two-dimensional image of the symbol based on light reflected from the shapes and spaces of the symbol, locating a portion of the symbol as a starting point based on the stored image; substantially simultaneously performing a plurality of symbol reading subroutines based on the stored image and the located portion;

processing a plurality of output signals produced from each of the symbol readings subroutines;

providing a decoded signal that represents the data encoded in the symbol based on the plurality of processed output signals; and wherein substantially simultaneously performing a plurality of symbol reading techniques includes performing a plurality of threads through a plurality of symbol reading modules, wherein the symbol reading modules are grouped within sets of modules having common functionality, and wherein a plurality of threads include all of the modules in each set of modules.

6. The method of claim 5 wherein substantially simultaneously performing a plurality of symbol reading subroutines includes substantially simultaneously performing a plurality of different symbol reading methods based on the stored image and the located portion, wherein processing a plurality of output signals includes producing, from a plurality of different symbol reading methods, a majority of similar output signals and at least one minority output signal, and selecting a one of the majority output signals as the decoded signal.

7. The method of claim 5 wherein substantially simultaneously performing a plurality of symbol reading subroutines includes substantially simultaneously performing a single symbol reading method, the symbol reading method being initiated at different selected portions of the stored image of the symbol.

8. The method of claim 5 wherein substantially simultaneously performing a plurality of symbol reading subroutines includes substantially simultaneously performing a single symbol reading method, the symbol reading method being initiated at different selected portions of the stored image of the symbol, and wherein processing a plurality of output signals includes:

determining that distortions exist in each of the output signals; and combining portions of at least some of the output signals to produce a complete decoded signal.

9. A method of reading a two-dimensional stored image of machine-readable visual indicia, the machine-readable visual indicia having a plurality of information bearing indicia extending and decodable along at least one axis, the method comprising:

substantially simultaneously performing a plurality of reading techniques based no the two-dimensional stored image of the machine-readable visual indicia;

processing at least two output signals produced from the plurality of reading techniques;

providing a decoded signal that represents the data encoded in the machine-readable visual indicia based on the at least two processed output signals wherein substantially simultaneously performing a plurality of reading techniques includes substantially simultaneously performing a plurality of different reading methods based on the image, wherein each of a plurality of different reading methods has a priority, and wherein processing at least two output signals includes selecting the output signal produced by a highest priority reading method.

10. The method of claim 9 wherein substantially simultaneously performing a plurality of reading techniques includes substantially simultaneously performing a plurality of different reading methods based on the image, and wherein one of a plurality of different reading methods is a rapid method of reading the machine-readable visual indicia.

11. A method of reading a two-dimensional stored image of machine-readable visual indicia, the machine-readable visual indicia having a plurality of information bearing indicia extending and decodable alone at least one axis, the method comprising:

substantially simultaneously performing a plurality of reading techniques based on the two-dimensional stored image of the machine-readable visual indicia;

processing at least two output signals produced from the plurality of reading techniques;

providing a decoded signal that represents the data encoded in the machinereadable visual indicia based on the at least two processed output signals; and wherein substantially simultaneously performing a plurality of reading techniques includes performing a plurality of reading tasks, wherein the reading tasks are each grouped within a set of locating tasks, a set of sampling and profile producing tasks, a set of profile processing tasks or a set of decoding tasks.

12. A method of rereading a two-dimensional stored image of machine-readable visual indicia the machine-readable visual indicia having a plurality of information bearing indicia extending and decodable along at least one axis, the method comprising:

substantially simultaneously performing a plurality of reading techniques based on the two-dimensional stored image of the machine-readable visual indicia;

processing at least two output signals produced from the plurality of reading techniques;

providing a decoded signal that represents the data encoded in the machine-readable visual indicia based on the at least two processed output signals; and wherein substantially simultaneously performing a plurality of reading techniques includes performing a plurality of predetermined tasks selected from a plurality of reading tasks, wherein the reading tasks are grouped within sets of tasks having common functionality, and wherein at least some of the predetermined tasks include a selected task in each set of modules.

13. A method of reading a two-dimensional stored image of machine-readable visual indicia, the machine-readable visual indicia having a plurality of information bearing indicia extending and decodable along at least one axis, the method comprising:

substantially simultaneously performing a plurality of reading techniques based on the two-dimensional stored image of the machine-readable visual indicia;

processing at least two output signals produced from the plurality of reading techniques;

providing a decoded signal that represents the data encoded in the machine-readable visual indicia based on the at least two processed signals; and wherein substantially simultaneously performing a plurality of reading techniques includes performing a plurality of paths through a plurality of reading tasks, wherein the reading tasks are grouped within sets of tasks having common functionality, and wherein a plurality of paths include all of the tasks in each set of tasks.

14. The method of claim 13 wherein substantially simultaneously performing a plurality of reading techniques includes substantially simultaneously performing a plurality of different reading methods based on the image, wherein processing at least two output signals includes producing from the plurality of different reading methods, a plurality of similar output signals, and selecting a one of a plurality of similar output signals.

15. The method of claim 13 wherein substantially simultaneously performing a plurality of reading techniques includes substantially simultaneously performing a single reading method, the reading method being initiated at different selected portions of the stored image of the machine-readable visual indicia.

16. The method of claim 13 wherein substantially simultaneously performing a plurality of reading techniques includes substantially simultaneously performing a single reading method, the reading method being initiated at different selected portions of the stored image of the machine-readable visual indicia, and wherein processing at least two output signals includes:

determining that distortions exist in the output signals; and combining portions of at least some of the output signals to produce the decoded signal.

17. The method of claim 13 wherein substantially simultaneously performing a plurality of reading techniques includes substantially simultaneously performing a plurality of different reading methods based on the image, and wherein processing at least two output signals includes selecting portions of at least some of the output signals and combining the portions to produce the decoded signal.

18. An apparatus for decoding a machine-readable symbol representing encoded information, the symbol including an array of shapes and spaces between each shape that encode data, the shapes and spaces being arranged along at least one axis, the apparatus comprising:

an image sensor that receives light reflected from the symbol and that produces an image signal therefrom that represents a two-dimensional image of the shapes and spaces conspiring the symbol;

a storage device for storing the image signal;

at least one processor coupled to the image sensor and the storage device, the processor processing the stored image signal and producing a signal indicative of the information encoded in the symbol, wherein the processor (a) locates a portion of the symbol in the stored image signal (b) substantially simultaneously performs a plurality of reading techniques based on the stored image signal and the located portion, (c) processes a plurality of output signals produced from at least some of the reading techniques and (d) provides a decoded signal that represents the data encoded in the symbol based on the plurality of output signals; and wherein the processor substantially simultaneously performs a pluralities of different symbol reading techniques based on the stored image and the located portion, wherein each of a plurality of different symbol reading techniques has a priority, and selects the output signal produced by a highest priority symbol reading technique.

19. The apparatus of claim 18 wherein the processor substantially simultaneously performs a plurality of different symbol reading techniques based on the stored image and the located portion, and wherein one of a plurality of different symbol reading techniques is a rapid method of reading the symbol when the symbol lacks any defects and damage.

20. The apparatus of claim 18 wherein the processor substantially simultaneously performs a single symbol reading technique, the symbol reading technique being initiated at different selected portions of the stored image signal.

21. The apparatus of claim 18, further comprising a plurality of processors, wherein each processor performs a one of the different symbol reading techniques.

22. An apparatus for decoding a machine-readable symbol representing encoded information, the symbol including an array of shapes and spaces between each shape that encode data, the shapes and spaces being arranged along at least one axis, the apparatus comprising:

an image sensor that receives light reflected from the symbol and that produces an image signal therefrom that represents a two-dimensional image of the shapes and spaces comprising the symbol:

a storage device for storing the image signal;

at least one processor coupled to the image sensor and the storage device, the processor processing the stored image signal and producing a signal indicative of the information encoded in the symbol, wherein the processor (a) locates a portion of the symbol in the stored image signal, (b) substantially simultaneously performs a plurality of reading techniques based on the stored image signal and the located portion, (c) processes a plurality of output signals produced from at least some of the reading techniques and (d) provides a decoded signal that represents the data encoded in the symbol based, on the plurality of output signals; and wherein the processor performs a plurality of symbol reading tasks, wherein the symbol reading tasks are each grouped within one of a set of symbol locating tasks, set of symbol sampling and profile producing tasks, set of profile processing tasks and set of decoding tasks.

23. The apparatus of claim 22, further comprising a plurality of processors, wherein each processor performs a one of the different symbol reading techniques.

24. An apparatus for decoding a machine-readable symbol representing encoded information, the symbol including an array of shapes and spaces between each shape that encode data, the shapes, and spaces being arranged along at least one axis, the apparatus comprising:

an image sensor that receives light reflected from the symbol and that produces an image signal therefrom that represents a two-dimensional image of the shapes and spaces comprising the symbol;

a storage device for storing the image signal;

at least one processor coupled to the image sensor and the storage devices the processor processing the stored image signal and producing a signal indicative of the information encoded in the symbol, wherein the processor (a) locates a portion of the symbol in the stored image signal, (b) substantially simultaneously performs a plurality of reading techniques based on the stored image signal and the located portion, (c) processes a plurality of output signals produced from at least some of the reading techniques, and (d) provides a decoded signal that represents the data encoded in the symbol based on the plurality of output signals; and wherein the processor performs a plurality of predetermined threads through a plurality of symbol reading tasks, wherein the symbol reading tasks are grouped within sets of tasks having common functionality, and wherein at least some of the predetermined threads include a selected task in each set of tasks to solve a predetermined error to which the symbol may suffer.

25. An apparatus for decoding a machine-readable symbol representing encoded information, the symbol including an array of shapes and spaces between each shape that encode data, the shapes and spaces being arranged along at least one axis, the apparatus comprising:

an image sensor that receives light reflected from the symbol and that produces an image signal therefrom that represents a two-dimensional image of the shapes and spaces comprising the symbol;

a storage device for storing the image signal;

at least one processor coupled to the image sensor and the storage device, the processor processing the stored image signal and producing a signal indicative of the information encoded in the symbol, wherein the processor (a) locates a portion of the symbol in the stored image signal, (b) substantially simultaneously performs a plurality of reading techniques based on the stored image signal and the located portion, (c) processes a plurality of output signals produced from at least some of the reading techniques, and (d) provides a decoded signal that represents the data encoded in the symbol based on the plurality of output signals: and wherein the processor performs a plurality of threads through a plurality of symbol reading tasks, wherein the symbol reading tasks are grouped within sets of tasks having common functionality, and wherein a plurality of threads include all of the tasks in each set of tasks.

26. The apparatus of claim 25 wherein the processor substantially simultaneously performs a pluralities of different symbol reading techniques based on the stored image and the located portion, wherein each of a plurality of different symbol reading techniques has a priority, and selects the output signal produced bit a highest priority symbol reading technique.

27. The apparatus of claim 25 wherein the processor substantially simultaneously performs a plurality of different symbol reading techniques based on the stored image signal and the located portion, produces, from a plurality of different symbol reading techniques, a majority of similar output signals and at least one minority output signal, and selects a one of the majority output signals as the decoded signal.

28. The apparatus of claim 25 wherein the processor substantially simultaneously performs a single symbol reading technique, the symbol reading technique being initiated at different selected portions of the stored image signal, determines that distortions exist in each of the output signals, and combines portions of at least some of the output signals to produce a complete decoded signal.

29. The apparatus of claim 25, further comprising a plurality of processors, wherein each processor performs a one of the different symbol reading techniques.

* * * * *